(12) United States Patent
Striem Amit et al.

(10) Patent No.: US 9,413,773 B2
(45) Date of Patent: Aug. 9, 2016

(54) METHOD AND APPARATUS FOR CLASSIFYING AND COMBINING COMPUTER ATTACK INFORMATION

(71) Applicant: Cybereason Inc, Wilmington, DE (US)

(72) Inventors: Yonatan Striem Amit, Gedera (IL); Elan Pavlov, Boston, MA (US)

(73) Assignee: Cybereason Inc., Wilmington, DE (US)

( * ) Notice: Subject to any disclaimer, the term of this patent is extended or adjusted under 35 U.S.C. 154(b) by 43 days.

(21) Appl. No.: 13/827,141

(22) Filed: Mar. 14, 2013

(65) Prior Publication Data

US 2014/0283026 A1 Sep. 18, 2014

(51) Int. Cl.
*G06F 11/00* (2006.01)
*H04L 29/06* (2006.01)

(52) U.S. Cl.
CPC .................................. *H04L 63/1416* (2013.01)

(58) Field of Classification Search
CPC . H04L 63/14; H04L 63/1408; H04L 63/1416; H04L 63/1425; H04L 63/1433

USPC ...................................................... 726/22–25
See application file for complete search history.

(56) References Cited

U.S. PATENT DOCUMENTS

| | | | |
|---|---|---|---|
| 7,222,366 B2* | 5/2007 | Bruton et al. | 726/23 |
| 7,568,232 B2* | 7/2009 | Mitomo et al. | 726/25 |
| 7,735,141 B1* | 6/2010 | Noel et al. | 726/25 |
| 7,801,840 B2* | 9/2010 | Repasi et al. | 706/52 |
| 7,809,670 B2* | 10/2010 | Lee et al. | 706/59 |
| 8,181,252 B2* | 5/2012 | Jajodia et al. | 726/25 |
| 8,245,301 B2* | 8/2012 | Evans et al. | 726/23 |
| 2011/0302653 A1* | 12/2011 | Frantz et al. | 726/22 |

\* cited by examiner

*Primary Examiner* — Nirav B Patel
(74) *Attorney, Agent, or Firm* — Flachsbart & Greenspoon, LLC

(57) ABSTRACT

A method and apparatus for classifying and combining computer attack information identifying as malicious events, events in a network that cause organizationally or functionally distant entities to become closer to each other, the method comprising identifying as malicious events, events in a network that cause organizationally or functionally distant entities to become closer to each other.

19 Claims, 5 Drawing Sheets

US 9,413,773 B2

METHOD AND APPARATUS FOR CLASSIFYING AND COMBINING COMPUTER ATTACK INFORMATION

TECHNICAL FIELD

The present disclosure relates to computer security in general, and to identifying attacks or attack attempts to a computer network, in particular.

BACKGROUND

Modern computerized systems all over the world are often threatened by intrusive attacks. Some attacks are targeted at a specific computer or network for a specific purpose, such as causing damage or collecting specific information. Other attacks, however, are more general and are targeted at a wide range of computers, networks and users.

Intrusion detection systems are constantly attempting to detect intrusive attacks and generate alerts whenever an intrusive attack is identified.

Typical intrusion detection systems are signature-based and/or protocol-analysis based. Such systems typically include a subset of: port assignment, port following, protocol tunneling detection, protocol analysis, Transmission Control Protocol (TCP) reassembly, flow assembly, statistical threshold analysis, pattern matching and the like.

A typical problem associated with attack detection and prevention relates to the tradeoff between false negative and false positive alerts and blocking. If the intrusion detection is too tolerant, it may miss malicious attacks and prove ineffective. Too strict detection, on the other hand, may identify legitimate activities as suspicious, activate prevention measures and disturb the normal work flow of a system, a user, or an organization. Too strict detection and prevention also require more resources, such as computing time, computing power, storage, and others.

In conventional systems, many false positive alerts are caused by legitimate users performing legitimate but rare activities. Such activities may be either unusual in time or be limited to a subset of the system. For example, an IT person of an organization may be assigned to upgrade software required by the employees of a specific department in the organization, for example the finance department. The IT person may then access the computers of the finance department one after the other, change the privileges on each computer, access a web site, download the software, install it and change the privileges back. Many of these actions may generate intrusion alerts which are false positive. Checking these alerts takes significant resources which incur high costs on the organization. Even worse—such events may conceal or make it harder to identify events caused by true attack or attack attempts.

BRIEF SUMMARY

One exemplary embodiment of the disclosed subject matter is a computer-implemented method performed by a computerized device, comprising identifying as malicious events, events in a network that cause organizationally or functionally distant entities to become closer to each other.

Another exemplary embodiment of the disclosed subject matter is a computer-implemented method performed by a computerized device, comprising: receiving a description of a computerized network, the description comprising an entity collection; receiving an event collection, each event of the event collection associated with at least one entity of the entity collection; determining one or more entity distances between two or more entities of the entity collection, wherein the entities are affected by two or more events; based on a minimal entity distance between entities affected by the events, determining an event distance between the events; and determining one or more event clusters based on the event distance. The method may further comprise associating a rank with each event. The method may further comprise a rank with each cluster, based on the rank associated with each event in the cluster. Within the method, the rank of the event is optionally based on comparing a distance between an entity associated with the event and other entities with and without the event. The method may further comprise associating events in the event clusters with malicious activity. The method may further comprise sending an alert associated with one or more events in the event clusters. The method may further comprise discarding the one or more entity distances if low value is obtained. The method may further comprise discarding the entity distance if high value is obtained. Within t method, determining the entity distances between the entities may comprise: determining a static distance between the entities; determining a dynamic distance between the entities, the dynamic distance associated with events common to the entities; and combining the static distance and the dynamic distance to obtain the entity distance. The method may further comprise reducing from the entity distances a previous distance value. Within the method, the entity is optionally selected from the group consisting of: a computer; a process; a thread; software; hardware; a module; a service; an application; a database; a web site; and a user. Within the method, the event may be selected from the group consisting of: changing a computer privilege; installing software; activating software; executing a process; and accessing a web site.

Yet another exemplary embodiment of the disclosed subject matter is an apparatus having a processing unit and a storage device, the apparatus comprising: a system description receiving component for receiving a description of a computerized network, the description comprising an entity collection; an event collection receiving component for receiving an event collection, each event of the event collection associated with one or more entities of the entity collection; an entity distance determination component for determining one or more entity distances between two or more entities of the entity collection, wherein the entities are affected by two or more events; an event distance determination component for determining an event distance between the events, based on a minimal entity distance between entities affected by the events; and an event clustering component a for determining one or more event clusters based on the event distances. The apparatus may further comprise an event and cluster rank determination component for determining a rank associated with an event or a rank associated with a cluster. Within the apparatus, the event and cluster rank determination component optionally determines the rank associated with the event based on comparing a distance between an entity associated with the event and other entities with and without the event. The apparatus may further comprise an alert generation component for generating an alert related to one or more of the event clusters.

Yet another exemplary embodiment of the disclosed subject matter is a computer program product comprising: a non-transitory computer readable medium; a first program instruction for receiving a description of a computerized network, the description comprising an entity collection; a second program instruction for receiving an event collection, each event of the event collection associated with one or more entities of the entity collection; a third program instruction for determining one or more entity distances between two or more entities of the entity collection, wherein the entities are affected by two or more events; a fourth program instruction for based on a minimal entity distance between entities affected by the events, determining an event distance between the events, and a fifth program instruction for determining one or more event clusters based on the event distance, wherein said first, second, third, fourth and fifth program instructions are stored on said non-transitory computer readable medium.

BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1A:
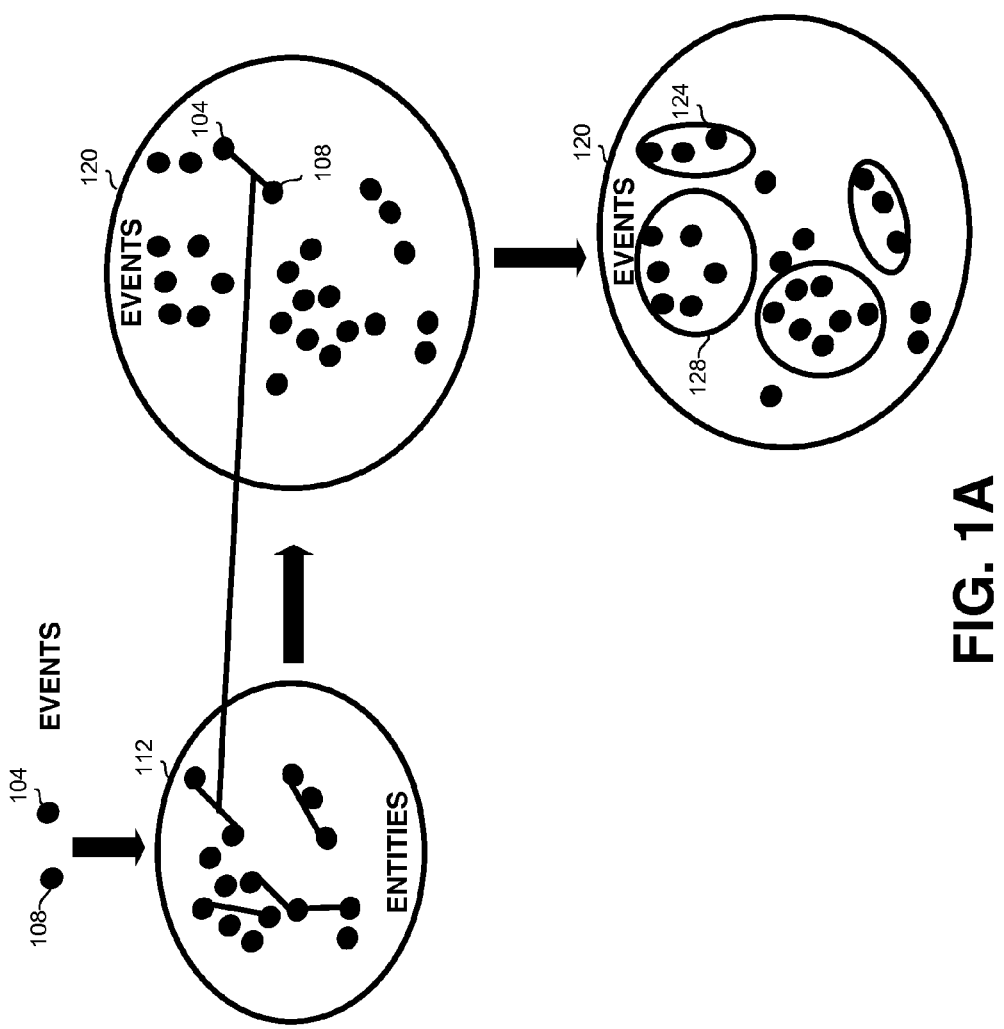
FIG. 1A is a graphic illustrative example of method for identifying clusters of events suspected as malicious in a computer network, in accordance with some exemplary embodiments of the disclosed subject matter.

The disclosed subject matter is described below with reference to flowchart illustrations and/or block diagrams of methods, apparatus (systems) and computer program products according to embodiments of the subject matter. It will be understood that blocks of the flowchart illustrations and/or block diagrams, and combinations of blocks in the flowchart illustrations and/or block diagrams, can be implemented by computer program instructions. These computer program instructions may be provided to one or more processors of a general purpose computer, special purpose computer, a tested processor, or other programmable data processing apparatus to produce a machine, such that the instructions, which execute via the processor of the computer or other programmable data processing apparatus, create means for implementing the functions/acts specified in the flowchart and/or block or blocks of block diagrams.

These computer program instructions may also be stored in a non-transient computer-readable medium that can direct a computer or other programmable data processing apparatus to function in a particular manner, such that the instructions stored in the non-transient computer-readable medium produce an article of manufacture including instruction means which implement the function/act specified in the flowchart and/or block diagram block or blocks.

The computer program instructions may also be loaded onto a device. A computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

One technical problem dealt with by the disclosed subject matter is the need to detect malicious activity in a computer system.

Malicious activity, such as any other activity in a computer network involves entities in the environment, and events performed on or involving these entities.

Exemplary entities may include computers, processes, modules, threads, applications, web sites, databases or any other entity used by an administrator, an IT professional, a regular user of a computer, or the like. In some embodiments users may also be considered entities.

Events may relate to actions associated with one or more entities. For example, a user may change the privileges of a computer, a process may be executed by a computer, a web site may be accessed by a module, a user may use a computer, or the like.

Events relating to malicious activities are therefore not different in their nature from legitimate events performed by legitimate users. Even when relating to rare or suspicious events, such as a user from finance department changing privileges on a computer, such events may be performed legitimately, for example by an IT personnel performing maintenance or upgrade tasks on computers in the department.

Therefore when trying to detect suspicious events, the corpus of detected events or even the corpus of detected suspicious events may amount to significant quantities which do not enable efficient checking and detection of malicious activity.

One technical solution comprises the identification of events that may be suspicious as being associated with malicious attacks or attack attempts, and identifying groups of related events which are closer to each other, relatively to the distance from other events, such that they may be associated with one attack.

In order to identify suspicious events, the collected events may be ranked by their importance, wherein importance may relate to the event making distant entities closer to each other. The terms close and distant may refer to an organizational and/or functional metric. For example, distance between two computers may be defined based on whether the computers belong to the same organizational unit or department, the number and types of software components installed on the two computers, whether their users access the same specific web sites, or the like.

Entities which are close in their organizational association and functionality, may also be referred to as "network-adjacent" entities, and may ordinarily share a multiplicity of non-malicious events, while distant entities normally share fewer such events.

There are, however other metrics which can be used to cluster entities. These include but are not limited to organizational charts, similarities between the users, similarities between programs used on the computers, similarities in timing of installation of programs, any other metric, or a combination of such metrics.

Internal and authorized changes in the system, such as installation of new software may operate on entities such as computers having significant amount of commonality, thus the installation of new software does not impact the amount of commonality. However, an attacker, who may be a person or a process, is generally unaware of the exact distances between entities in the system. While attackers can come in many guises, this includes an attacker from within the system who might be aware of some estimates of the distances, as well as an attacker which is external to the system does not have information about the entity distance, or does not have access to the entities in the organization in a systematic manner. Therefore an attacker is likely to attack computers which are generally not already close together, and may thus create events which cause objects which are previously distant to become close, e.g., share more events or become similar.

In other words, the disclosed method and apparatus utilize the observation that internal and authorized changes in the system, such as installation of new software, are usually performed following existing similarity. For example, an IT person may install software on multiple computers belonging to the finance group. However, the computers belonging to the finance group already have significant amount of commonality, thus the installation of new software does not impact the amount of commonality. An external attacker, on the other hand, is unaware of the distances between entities in the system, therefore an attacker is likely to attack computers which are generally not already close together. Thus an attack may create events that make objects which are initially distant to become close.

When monitoring a network, it may be required to assign ranks to events collected in the system wherein the rank may be associated with suspicion level that the event is associated with an attack, and to identify clusters or groups of events that make distant computers closer, since such groups of events are suspicious of belonging to malicious activity. Groups in which, for example, the sum, average or other characteristic of the ranks of the group events is higher, may represent event groups associated with an attack.

Determining the rank, also referred to as the weight, of an event may be performed by comparing the average, sum or other characteristics of the distance between entities associated with the event from other entities, with and without the event.

Determining such groups may be performed as follows: a distance, or relative ranking may be defined between any two events, as detailed below; a graph in which the nodes are events, and each edge represents the distance between two events may be defined; the graph may be clustered to identify groups of close events, and by eliminating events related to network-adjacency, the main remaining clusters indicate groups of suspicious events.

The distance between events may be determined as follows: a distance is determined between any two entities affected by the two events. The distance may relate to the metric between the entities as defined above, and to the number of events the objects share in a particular time frame. The quality or weight of each such shared event may be considered as well, such that for example five (5) critical events may indicate greater closeness than fifty (50) non-important events such as launching a word processing application. Connections between very close entities may be discarded since they usually stem from network-adjacency. Connections between very distant entities may be discarded as well, since the shared events reflect sporadic activity, and represent general noise in the network and no particular activity. Thus, the significant connections are between entities that are not close by the network structure or ordinary usage, but become close due to a multiplicity of shared events, since such closeness may indicate activities by an attacker.

The distance between the two events may then be defined as the minimal distance between any two such objects that share the two events.

In alternative embodiments, the distance between two entities may be determined using a "replacement method", which relates to the number of events associated with one entity, which when the entity is replaced with the other entity, still yields a valid event.

One technical effect of the disclosure relates to identifying events that are suspicious as malicious, since they bring organizationally or functionally entities closer to each other.

Another technical effect of the disclosure relates to identifying groups of such events which make pairs of entities become closer, thus getting a clearer indication for malicious activity involving a multiplicity of events.

Another technical effect of the disclosure relates to identifying entities in a network which are generally distant, but become closer by common activity, which may indicate external malicious activity targeted against random entities in the organization.

Yet another technical effect of the disclosure it the identification of a set of events which bring computers closer across time.

Yet another technical effect of the disclosure is the identification of computers which are found to be close together, but the removal of a small number (e.g., 5) of the common events renders them significantly further apart. The definition of distance between computers may depend, for example, on the average distance of computers in the system.

Referring now to FIG. 1A, showing a graphic illustrative example of determining clusters of suspicious events.

Out of the events collected while monitoring the network, it is required to identify groups of events which are suspicious as being associated with malicious activity. It will be appreciated that the events may relate to computer local events as well as network events, thus providing a full picture of the monitored network.

The network is monitored and events are collected. It is then required to determine a distance between any two events of the collection, such as event 104 and event 108.

Entity collection 112 is generated, which comprises all the entities for which both event 104 and event 108 apply. The distance between any two such entities may be determined based upon a combination of:

1. A static metric defined between the entities, for example whether computers belong to the same unit, whether users use the same software, or the like. A low metric implies network-adjacency and a short distance.

2. A dynamic metric: the number of events common to the two entities. Optionally, the type of events may be considered as well. For example, general events such as "a word processing application was started" may be assigned a low weight while more specific events may be assigned a higher weight. A large number of shared events, including significant events, implies closeness, i.e., a short distance, while few common events imply a higher distance.

The two metrics may be combined, for example added, averaged, multiplied, or the like.

Entity pairs for which the combined metric is low, implying that the static metric is low, and which have a large number of shared events, may be discarded since they are close to each other due to normal activity, regardless of whether they are attacked or not.

Entity pairs for which the static metric is high, implying that the static metric is high, and which have a small number of shared events, may also be discarded since they are remote even if attacked, therefore they provide little information.

Entity pairs having low static distance but few events are also insignificant.

Entity pairs having high static distance but small dynamic distance, i.e., a lot of shared events, are significant since the shared events brought these entities closer together.

Out of the entity pairs (which share event 104 and event 108) not discarded, the one with the lowest distance may determine the distance between the two events, event 104 and event 108.

An event graph 120 may then be defined based upon these pairwise distances between events, wherein the distance between any two events is determined as described.

Event graph 120 may then undergo clustering, to identify event clusters such as clusters 124 or 128, which made remote entities become closer, and are thus suspicious of malicious activity.

Figure 1B:
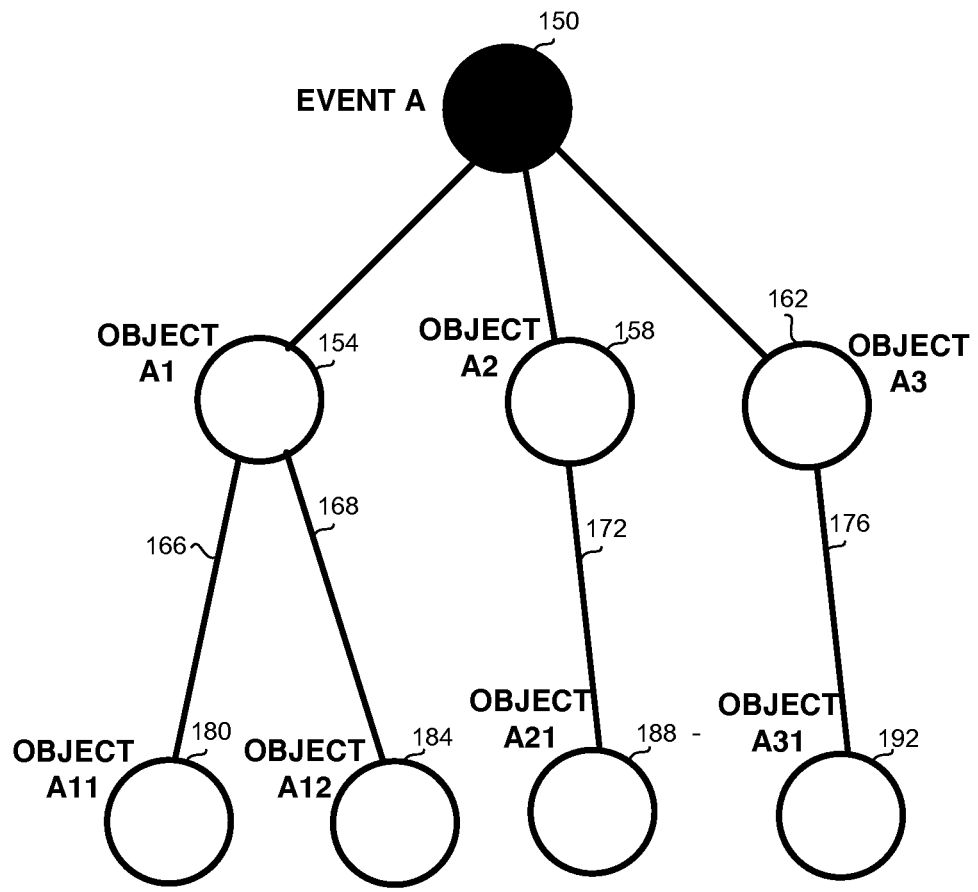
FIG. 1B is a graphic illustrative example of a method for determining a rank of an event, in accordance with some exemplary embodiments of the disclosed subject matter.

Referring now to FIG. 1B, showing an illustrative example of a method for determining a rank or weight that may be assigned to an event, wherein the weight may represent a suspicion level, e.g. to what degree the event is suspected to constitute or be a part of a malicious attack or attack attempt. The level may be combined with an initial grade associated with the event. For example, accessing a news web site may be associated with a low initial grade, while changing the permission of a computer may be associated with a higher grade.

Given event A (150), all associated entities, being object A1 (154), object A2 (158), object A3 (162), are identified. For example, if event A (150) is a suspicious connection to an Internet site, object A1 (154) may be the computer used for the connection, object A2 (158) may be the program it connected from, and object A3 (162) may be the internet site.

Then, for each of the objects associated with event A (150), all other objects having relatively low distance or otherwise associated with the object are determined. In the example of FIG. 2B, these objects may be object A11 (180) and object A12 (184) associated with object A1 (154), object A21 (188) associated with object A2 (158), and object A31 (192) associated with object A3 (162). For example, if object A1 (154) is the computer mentioned above, objects A11 (180) and A12 (184) may be other computers in the organization, other computers in the organizational unit, other computers that accessed that web site, or the like.

Then, the link connecting each pair of objects that include a first object associated with the event and a second object associated with the first object, is evaluated. In the example of FIG. 2B, these links would be link 166 connecting object A1 (154) and object A11 (180), link 168 connecting object A1 (154) and object A12 (184), link 172 connecting object A2 (158) and object A21 (188) and link 176 connecting object A3 (162) and object A31 (192). Evaluating a grade of each such link may comprise computing the pairwise distances between the objects at the ends of the link, with and without event A, and determining the difference, ratio or another comparison between the two distances. This relation would provide to what degree event A is responsible for bringing the two objects closer to each other.

The distance between two objects may be determined using any metric, such as a predetermined metrics, a "replacement" metrics detailed below, the entity distance determination described in association with FIG. 1A above or the like.

An event may then be assigned a rank, based on the associated links. In the example of FIG. 2B, Event A (150) may be assigned a rank based on the grades of links 166, 168, 172 and 176, or a subset thereof. The ranking may, for example, average the grades of all links, average the grades of a predetermined number or percentage of the links having the highest grades, or the like.

The resulting rank of the event thus provides an indication of to what degree the event brought pairs of objects closer together. Objects that are ordinarily close to one another would not be affected, while objects that are normally distant but have become closer due to the event may contribute to the rank of the event.

As mentioned above, distance between two objects A and B may be determined using a "replacement score", which contains the set of all events Ei which relate to object A, such that replacing object A with object B would provide a valid event. For example, if event E1 is defined as file F found on computer C1, and event E2 is defined as file F found on computer C2, entities C1 and C2 have a non-zero replacement score. The higher the number of such replacements, the higher is the replacement score and the lower is the distance between the objects.

Figure 2A:
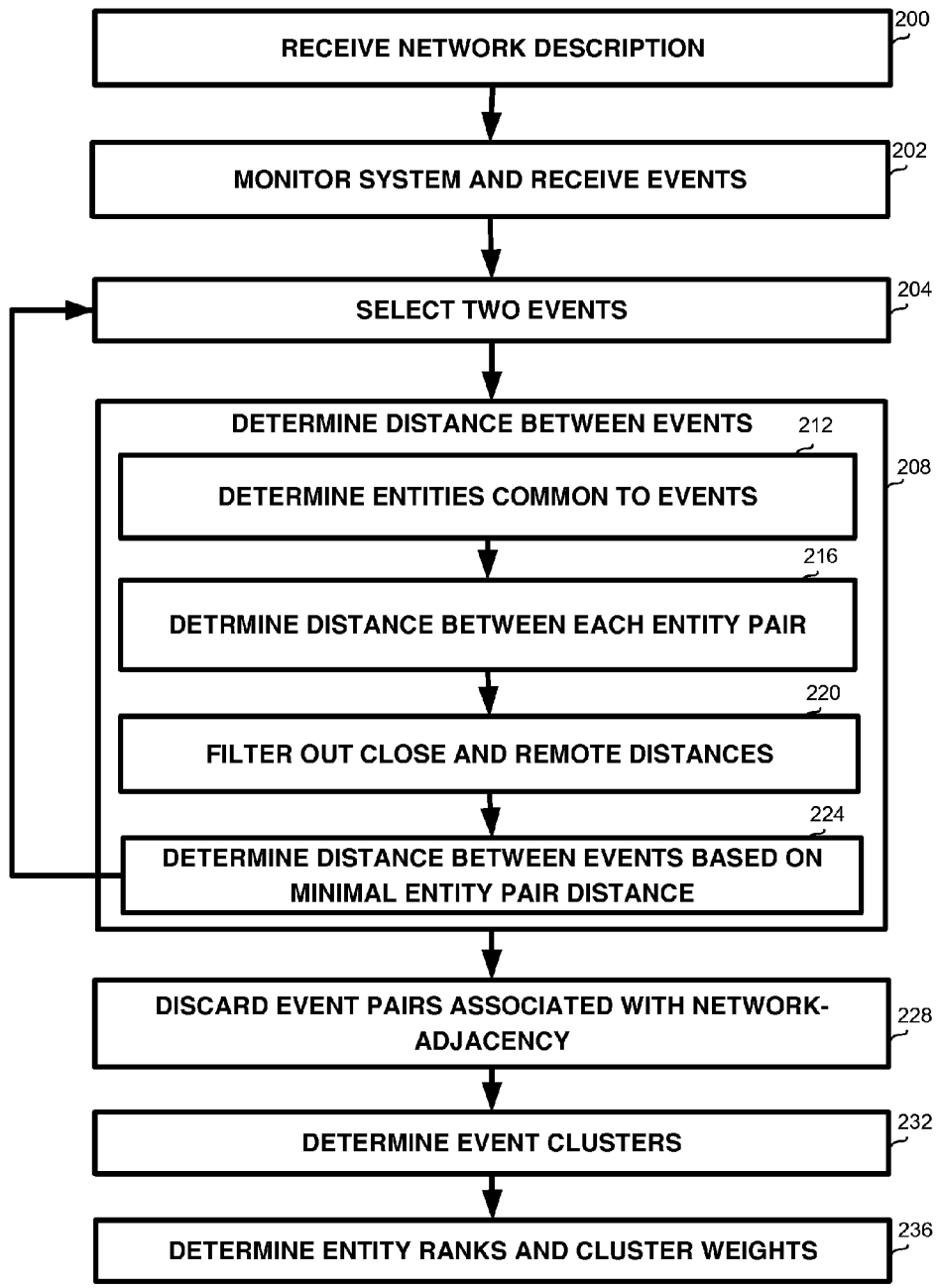
FIG. 2A is a flowchart of steps in a method for identifying malicious events in a computer network, in accordance with some exemplary embodiments of the disclosed subject matter.
Figure 2B:
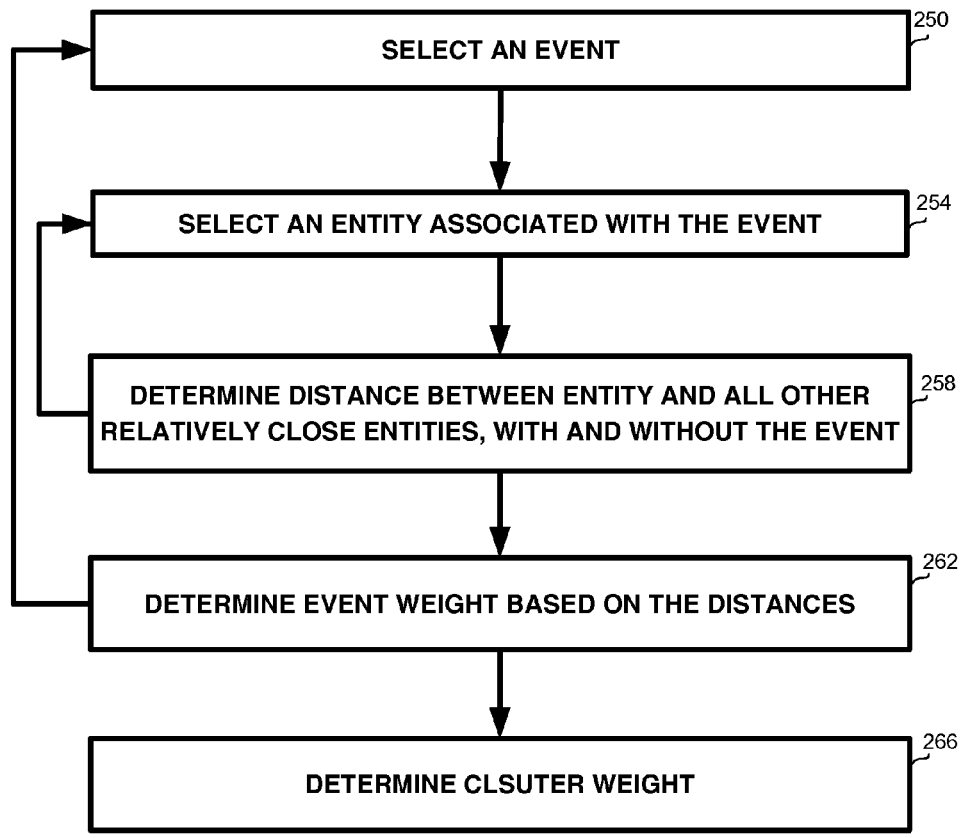
FIG. 2B is a flowchart of steps in a method for determining an event rank or a cluster rank, in accordance with some exemplary embodiments of the disclosed subject matter.

Referring now to FIG. 2, showing a flowchart of steps in a method for identifying malicious events in a computer network.

On step 200 the network description may be received. The description may comprise the computers, the division into organizational units, users and privileges of each computer, software installed on each computer, web sites accessed by each computer, or the like.

On step 202 the system may be monitored and information about events such as changing privileges, installing software, accessing a web site or the like may be received.

On step 204, two of the events may be selected. The events may be selected randomly, or in another manner. The two events may be of the same type or of different types.

On step 208 the distance between the two events may be determined, so that when all event pairwise distances are available the events may be clustered. Determining the event distance may comprise the following steps:

On step 212, all entities common to the two events may be identified. For example, if one event is changing privileges and the other is accessing a specific web site, all computers for which the privileges have been changed and the specific web site was accessed from, are identified.

On step 216, the distance between each pair of such entities may be determined. The distance may be determined as follows:

First, a static metric may be applied, which determines a static distance between the entities, for example whether computers belong to the same organizational unit, whether they have the same installed software, or the like. The closer the entities are to one another, the lower is the static metric.

Then a dynamic metric may be applied, taking into account the number of events common to the two entities. For example, if two computers accessed the same web sites, their privileges have been changed, or the like, the dynamic metric will be lower. The type of shared events may also be taken into account, such that ordinary events such as accessing a news website will have lower significance then extraordinary events such as changing privileges. The dynamic metric may or may not relate to different time periods. For example, an event which may be common at a specific time period may be suspicious at other times.

The two metrics may be combined, providing a distance indication for each entity pair. In some embodiments, if the computers are close, e.g. the static distance is below a threshold, regardless of the events, computation of the dynamic metric may be omitted.

It will be appreciated that the entity distance calculation does not necessarily consider the specific two events differently from other events. Rather, the distance between any two entities may be computed once, and then used when determining the distance between any two events shared by the two entities.

On step 220 part of the pair distances may be discarded. The pairs having the lower distance values are those computers that are statically close, i.e., share a lot of characteristics, and also share a lot of events, which is indicative of ordinary behavior. The pairs having the high distance values may also be discarded since they indicate distant entities with little in common, and with few common events. Both situations do not provide indications for an external attack at the two entities. Medium values may indicate close entities with little shared events which is also not an alarming situation, or statically-distant computers, having significant number or type of shared events, which may be the result of an attack such as an external attack.

On step 224, out of the non-discarded entity pairs, the distance of the entity pair having the lowest combined distance, or a manipulation thereof, is set as the distance between the events selected on step 204. It will be appreciated that other metrics may also be used. For example, the average, average of a predetermined number of distances having the minimal values, or the like. The distance may also be normalized by the number of entity pairs whose distance was changed.

Steps 204 and 208, including the substeps of step 208 are repeated for substantially all the pairs of the event collection. Alternatively, the substeps may be repeated for active events or for some other subset of events which is desired to be analyzed. In order to improve performance, some pre-computation may be performed and its results may be stored for repeated use.

On step 228, event pairs known to be associated with network adjacency, such as events related to the same software installation may be discarded. It will be appreciated that such event pairs may also be discarded at an earlier stage.

On step 232, an event graph may be built using the determined distances, and event clusters may be identified from the graph using any clustering methods such as K-means clustering, Graph K-Means, Information bottleneck, Page-Rank clustering or others.

On step 236, the rank or weight of each event may be determined, and the rank or weight of each cluster may be determined based on the event rank or weight. An implementation of determining the event weight is provided on FIG. 2B below. The cluster weight or rank may be determined as the sum of the weights or ranks of all events in the cluster, the average, the average of the weight of the events having the highest weights, or the like.

It is clear to one of ordinary skill in the art that the order of these steps might be varied and that in some situations some of the steps might not be calculated or might be approximated. Alternatively, some steps can be performed for only a subset of entities or events.

It will be appreciated that in ideal normal situations when no attack occurs, no cluster will be created, since no weight will be assigned to an event pair, i.e., there will be no edge in the graph connecting them. This is the normal behavior since entities will be either statically close to each other and share many events, or remote from each other and share few events. In either case, there will be no such entity pair to account for a distance measure between two events.

However, large systems are rarely ideal and some clusters may be created even in normal situations. Yet, under external attacks, more significant clusters are expected to be formed, so that the attack may be identified.

In some embodiments it may be required to introduce a notion of time into the determination of distance between entities. For example, a situation in which entities are distant from each other but have become closer due to shared events, may be acceptable if this is a known situation which has existed in a past check of the system.

Such condition may be verified if on step 220, when discarding too small or too high distances, medium distances may also be eliminated if in previous checks, for example a check performed an hour, a day, a week or the like, before the current check, their state was similar: large static distance which has become closer due to multiple shared events. This elimination may be regarded as equivalent to subtracting from the event graph a previous event graph which is known to represent a normal situation, thus leaving only the differences which may be due to malicious attack.

In some embodiments, for example in temporally close checks or in stable environments, this subtraction may be utilized, while periodic full checks may be performed without this subtraction.

It will be appreciated that the method may further comprise an alert generation step for issuing an alert for one or more events belonging to one or more identified clusters. The alert may be issued to any person or system in any required manner such as popping a message on a display device, sending an e-mail, sending a text message, or the like.

Referring now to FIG. 2B, showing steps in a method for determining a weight or a rank of an event, and optionally of an event cluster.

It will be appreciated that the weight of an event may be determined either before or after clustering the event group. It will be appreciated that if the specific clustering method used considers the weight of each element in the graph, then the event ranks have to be determined prior to clustering.

On step 250, an event, which may belong to an event cluster, may be selected.

On step 254, an entity associated with the event may be selected, for example an entity used by or affected by the event.

On step 258, for all entities which are relatively close to the first entity, for example belong to the same organizational unit, a weight of the link between the two entities may be determined, with and without the event selected on step 250. If no entities which are close to the first entity are defined, then the first entity may be compared to all other entities. The distance may be determined using any metrics or the replacement method.

On step 262, the weight of the event may be determined based, for example, on the weight of the links between an entity associated with the event and all other entities, on the weight of the links having the highest weights, or the like.

On step 266, the weight of a cluster may be determined, for example by combining the weights of all events of the cluster, or using any other measure.

Figure 3:
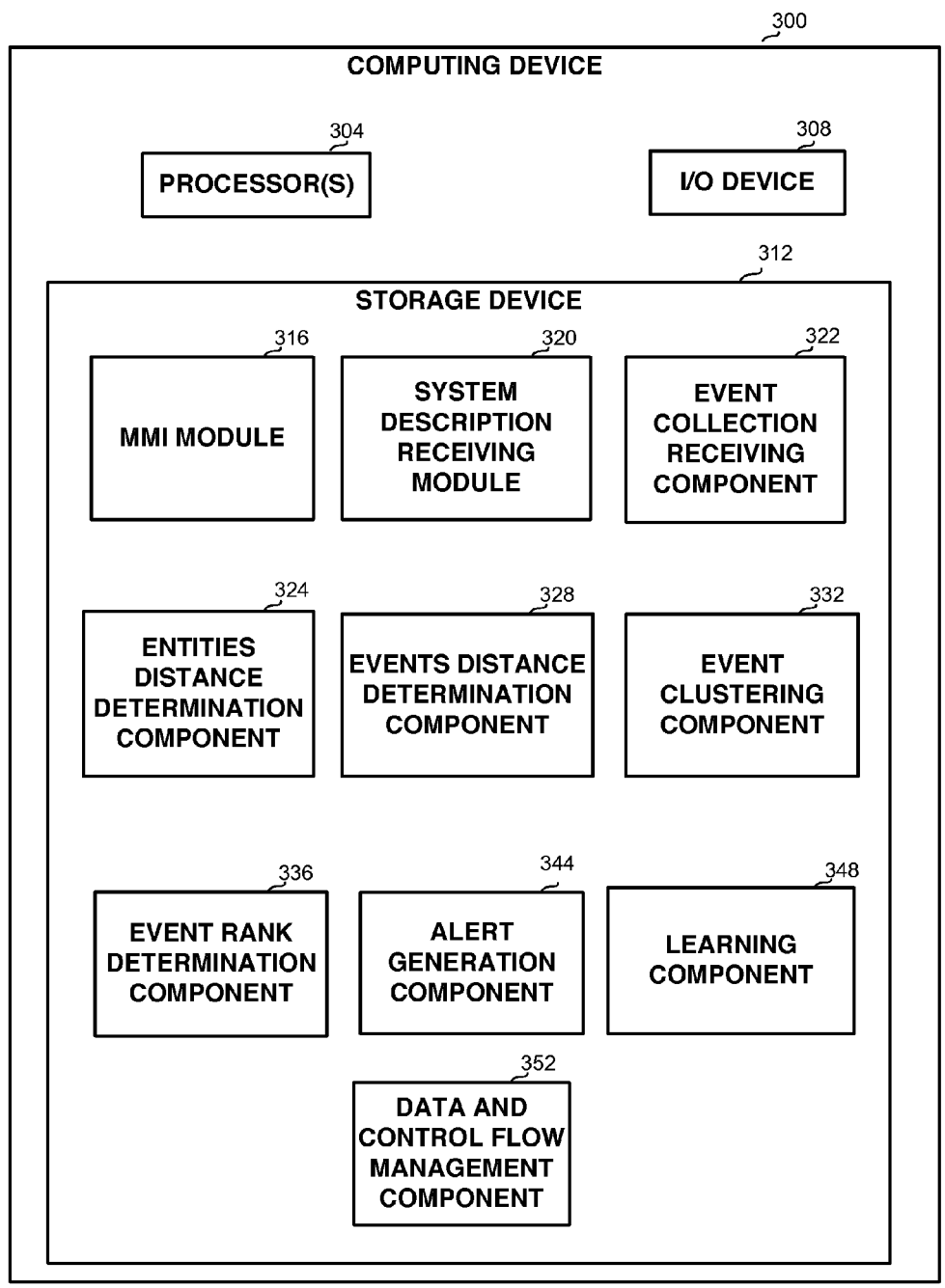
FIG. 3 is a block diagram of components in a computing device for identifying malicious events in a computer network, in accordance with some exemplary embodiments of the disclosed subject matter.

Referring now to FIG. 3, showing a block diagram of components in a computing device for identifying malicious events in a computer network.

The system may be implemented as one or more computing devices such as computing device 300, which may comprise one or more processors 304. Any of processors 304 may be a Central Processing Unit (CPU), a microprocessor, an electronic circuit, an Integrated Circuit (IC) or the like. Alternatively, computing device 300 can be implemented as firmware written for or ported to a specific processor such as digital signal processor (DSP) or microcontrollers, or can be implemented as hardware or configurable hardware such as field programmable gate array (FPGA) or application specific integrated circuit (ASIC). Processors 304 may be utilized to perform computations required by computing device 300 or any of its subcomponents.

In some embodiments, computing device 300 may comprise or be in communication with one or more input-output (I/O) devices 308 such as a terminal, a display for displaying an image, speakers, a microphone or another audio I/O devices or the like, a keyboard, a touch screen, an I/O device used for recognizing a person or interacting with the system, or the like.

Computing device 300 may comprise one or more storage devices 312 for storing executable components. Storage device 312 may also contain data during execution of one or more components. Storage device 312 may be persistent or volatile. For example, storage device 312 can be a Flash disk, a Random Access Memory (RAM), a memory chip, an optical storage device such as a CD, a DVD, or a laser disk; a magnetic storage device such as a tape, a hard disk, storage area network (SAN), a network attached storage (NAS), or others; a semiconductor storage device such as Flash device, memory stick, or the like. In some exemplary embodiments, storage device 312 may retain program code operative to cause any of processors 304 to perform acts associated with any of the steps shown in FIG. 2 above, for example receiving a system description, determining distance between entities or events, or the like.

The components detailed below may be implemented as one or more sets of interrelated computer instructions, executed for example by any of processors 304 or by another processor. The components may be arranged as one or more executable files, dynamic libraries, static libraries, methods, functions, services, or the like, programmed in any programming language and under any computing environment. Storage device 312 may comprise or be loaded with one or more of the components, which can be executed on computing platform 300 by any one or more of processors 304. Alternatively, any of the executable components may be executed on any other computing device which may be in direct or indirect communication with computing platform 300.

Storage device 312 may comprise man machine interface (MMI) module 316 for enabling a user to enter description of the system, receive results such as alerts or reports about ongoing activity, or the like. MMI module 316 may receive or display data using any of I/O devices 308, or on an I/O device associated with a different computing platform. MMI module 316 may also be provided as a web service executed by one computing platform and providing client functionality on another.

Storage device 312 may also comprise system description receiving module 320, for receiving system description from a user, including entities such as computers, processes, web sites, users or others; relations between entities, or the like. The description may be received from MMI module 316, loaded from another memory device, or the like.

Storage device 312 may comprise event collection receiving component 322 for receiving a collection of one or more events, one or more of which may be malicious. The events may be collected by a monitoring device or system and may be passed directly to event collection receiving component 322. Alternatively, the events may be stored and periodically provided to event collection receiving component 322.

Yet another component loaded to or stored on storage device 312 may be entity distance determination component 324 for determining the distance between two entities in the network, such as computers or processes.

Storage device 312 may comprise an events distance determination component 328 for determining a distance between two events, using the distances determined by entity distance determination component 324 between any two entities associated with the two events.

Storage device 312 may also comprise an event clustering component 332 which may optionally generate a graph based on the distances between event pairs as determined by events distance determination component 328, and clustering the graph, to detect event clusters which may be associated with malicious attacks.

Storage device 312 may also comprise an event and cluster rank determination component 336 for determining a rank associated with an event or a rank associated with a cluster. The weight associated with an event may be based on comparing a distance between an entity associated with the event and other entities with and without the event. A weight or rank of a cluster may be based on combining the ranks or weights of the events associated with the cluster.

Storage device 312 may comprise alert generation component 344 for generating and optionally sending alerts related for example to identifying clusters which may be associated with some suspicion level. Alerts related to different clusters may be combined and sent together, separately, or any combination thereof.

Storage device 312 may also comprise a learning component 348 for learning new or updated data, such as relation or distance between entities, weights of certain event types, or the like.

Storage device 312 may further comprise a data and control flow management component 352 for managing the flow of the processes and data, activating other components and providing the required data, or the like.

The disclosed system and method provide for detecting malicious attacks by identifying events that make entities that are ordinarily distant from each other and that normally share little events, closer. This may account for attack such as an external attack which attempts to perform operations on random entities such as computers, rather than on entities that are network-adjacent.

The flowchart and block diagrams in the figures illustrate the architecture, functionality, and operation of possible implementations of systems, methods and computer program products according to various embodiments of the present disclosure. In this regard, each block in the flowchart and some of the blocks in the block diagrams may represent a module, segment, or portion of program code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the disclosed subject matter may be embodied as a system, method or computer program product. Accordingly, the disclosed subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, any non-transitory computer-readable medium, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, and the like.

Computer program code for carrying out operations of the present disclosure may be written in any combination of one or more programming languages, including an object oriented programming language such as Java, Smalltalk, C++ or the like, conventional procedural programming languages, such as the "C" programming language or similar programming languages, scripting languages such as Perl, Python, Ruby, or any other programming language. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or steps plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A computer-implemented method performed by a computerized device, comprising:
    monitoring a set of events in a computer network comprising a multiplicity of entities, wherein the set of events comprises at least one malicious event and at least one non-malicious event;
    for each event of a multiplicity of events in the set of events, and for each pair of organizationally or functionally distant entities of a multiplicity of entity pairs of the computer network, performing the steps of:
        determining by a computer a first distance between entities of the pair, the first distance computed without the event;
        determining by the computer a second distance between the entities of the pair, the second distance computed with the event; and
    outputting an indication that the event of the multiplicity of events is a malicious event based on the second distance computing to be smaller than the first distance;
    wherein determining both the first and second distances between entities of the pair comprises:
        determining by the computer a static distance between the two entities, wherein the static distance is defined by the extent 1) that the two entities belong to the same organizational unit or department; and 2) that the two entities share common installed software components; and
        determining by the computer a dynamic distance between the two entities, wherein the dynamic distance is defined by the extent of 1) the number of common privilege changes on each of the entities 2) the number of common websites accessed by users of the entities; and 3) the number of common newly installed software applications on the entities; and
        combining the static distance and the dynamic distance to obtain each of the first and second distances;
    whereby computing the second distance with the event indicates a malicious event when the second distance computes to be smaller than the first distance.

2. A computer-implemented method performed by a computerized device, comprising:
    monitoring by a computer a set of events in a computer network comprising a multiplicity of entities, thereby obtaining an event collection comprising at least one first event of the collection being malicious and at least one second event of the collection being non-malicious, each event of the event collection associated with at least one entity in the computer network;
    for two events selected form the event collection, and for each entity pair of organizationally or functionally distant entities of a multiplicity of entity pairs of the computer network, wherein the entities in the entity pair are selected to be entities affected by the two events, performing the steps of:
  determining by the computer a first entity distance between two entities of the entity pair without the two events; and
  determining by the computer a second entity distance between the two entities of the entity pair, with the two events; and
  based on a difference between the first entity distance and the second entity distance, determining an event distance between the two events;
  determining that the two events are malicious events, based on the event distance; and
  outputting an indication that the two events are malicious events;
  wherein determining both the first and second entity distances comprises:
  determining by the computer a static distance between the two entities, wherein the static distance is defined by the extent 1) that the two entities belong to the same organizational unit or department; and 2) that the two entities share common installed software components; and
  determining by the computer a dynamic distance between the two entities, wherein the dynamic distance is defined by the extent of 1) the number of common privilege changes on each of the entities 2) the number of common websites accessed by users of the entities; and 3) the number of common newly installed software applications on the entities; and
  combining the static distance and the dynamic distance to obtain the entity distance;
  whereby computing the second distance with the event indicates a malicious event when the second distance computes to be smaller than the first distance.

3. The computer-implemented method of claim 2, further comprising associating a rank with each event.

4. The computer-implemented method of claim 3, further comprising the step of determining at least one cluster of entities with respect to the second distance calculation, and associating a rank with each cluster, based on a rank associated with each event in the cluster.

5. The computer-implemented method of claim 3, wherein the rank of the event is based on comparing a distance between an entity associated with the event and other entities with and without the event.

6. The computer-implemented method of claim 2, further comprising associating events in at least one event cluster with malicious activity.

7. The computer-implemented method of claim 6, further comprising sending an alert associated with at least one event in the at least one event cluster.

8. The computer-implemented method of claim 7, further comprising discarding the first entity distance or second entity distance if low value is obtained.

9. The computer-implemented method of claim 2, further comprising discarding the first entity distance or second entity distance if high value is obtained.

10. The computer-implemented method of claim 2, further comprising reducing from the first entity distance or second entity distance a previous distance value.

11. The computer-implemented method of claim 2, wherein the at least one entity is selected from the group consisting of: a computer; a process; a thread; software; hardware; a module; a service; an application; a database; a web site; and a user.

12. The computer-implemented method of claim 2, wherein the at least one event is selected from the group consisting of: changing a computer privilege; installing software; activating software; executing a process; and accessing a web site.

13. The computer-implemented method of claim 2, further comprising determining an event cluster comprising the at least two events.

14. The computer-implemented method of claim 2, further comprising receiving a description of the network, the description comprising at least one item selected from the group consisting of: division of computers in the network into organizational units, users of each computer; privileges of each user on a computer; software installed on each computer; and web sites accessed by each computer.

15. An apparatus comprising:
  a processing unit;
  a storage device;
  a display device;
  an event collection receiving component for monitoring a set of events in a computer network whereby obtaining an event collection comprising first event of the collection being malicious and at least one second event of the collection being non-malicious, each event of the event collection associated with at least one entity of a computer network;
  an entity distance determination component for selecting at least two entities of the computer network affected by at least two events, determining at least a first entity distance between the at least two entities without the at least two events of the event collection, and at least a second entity distance between the at least two entities with the at least two events, wherein said entity distance determination is configured to determine the first entity distance and the second entity distance for each entity pair of organizationally or functionally distant entities of a multiplicity of entity pairs of the computer network;
  an event distance determination component for determining an event distance between the at least two events, based on a difference between the first entity distance and the second entity distance;
  a cluster determination component for determining at least one event cluster;
  an event rank determination component for determining that the at least two events are malicious; and
  wherein said processor is further configured to output an indication that the at least two events are malicious;
  wherein determining the first entity distance and the at least one second entity distance comprises:
  determining by the computer a static distance between the two entities, wherein the static distance is defined by the extent 1) that the two entities belong to the same organizational unit or department; and 2) that the two entities share common installed software components; and
  determining by the computer a dynamic distance between the two entities, wherein the dynamic distance is defined by the extent of 1) the number of common privilege changes on each of the entities 2) the number of common websites accessed by users of the entities; and 3) the number of common newly installed software applications on the entities; and
  combining the static distance and the dynamic distance to obtain the entity distance, whereby computing the second distance with the event indicates a malicious event when the second distance computes to be smaller than the first distance.

16. The apparatus of claim 15, wherein the event rank determination component is an event and cluster rank determination component for determining a rank associated with a cluster.

17. The apparatus of claim 16, wherein the event and cluster rank determination component determines the rank associated with the event based on comparing a distance between an entity associated with the event and other entities with and without the event.

18. The apparatus of claim 15, further comprising an alert generation component for generating an alert related to at least one of the at least one event cluster.

19. A computer program product comprising:
a non-transitory computer readable medium;
a first program instruction for monitoring by a computer a set of events in a computer network, whereby obtaining an event collection comprising at least one first event of the collection being malicious and at least one second event of the collection being non-malicious, each event of the event collection associated with at least one entity in the computer network;
a second program instruction for determining for two events of the event collection, and for each entity pair of organizationally or functionally distant entities of a multiplicity of entity pairs of the computer network, wherein the entities in the entity pair are selected to be entities affected by the two events: at least a first entity distance between two entities of the entity pair without the two events;
a third program instruction for determining at least a second entity distance between the two entities with the two events;
a fourth program instruction for based on a difference between the first entity distance and the second entity distance, determining an event distance between the at least two events,
a fifth program instruction for determining that the at least two event are malicious events based on the event distance, and
a sixth program instruction for outputting an indication that the at least two events are malicious events;
wherein said first, second, third, fourth, fifth, and sixth program instructions are stored on said non-transitory computer readable medium;
wherein determining the first entity distance and the at least one second entity distance comprises:
determining by the computer a static distance between the two entities, wherein the static distance is defined by the extent 1) that the two entities belong to the same organizational unit or department; and 2) that the two entities share common installed software components; and
determining by the computer a dynamic distance between the two entities, wherein the dynamic distance is defined by the extent of 1) the number of common privilege changes on each of the entities 2) the number of common websites accessed by users of the entities; and 3) the number of common newly installed software applications on the entities; and
combining the static distance and the dynamic distance to obtain the entity distance,
whereby computing the second distance with the event indicates a malicious event when the second distance computes to be smaller than the first distance.

* * * * *